June 23, 1925. 1,543,180
O. H. MOORE
ELEVATING MECHANISM FOR ROOT HARVESTERS
Filed Oct. 9, 1923 5 Sheets-Sheet 1
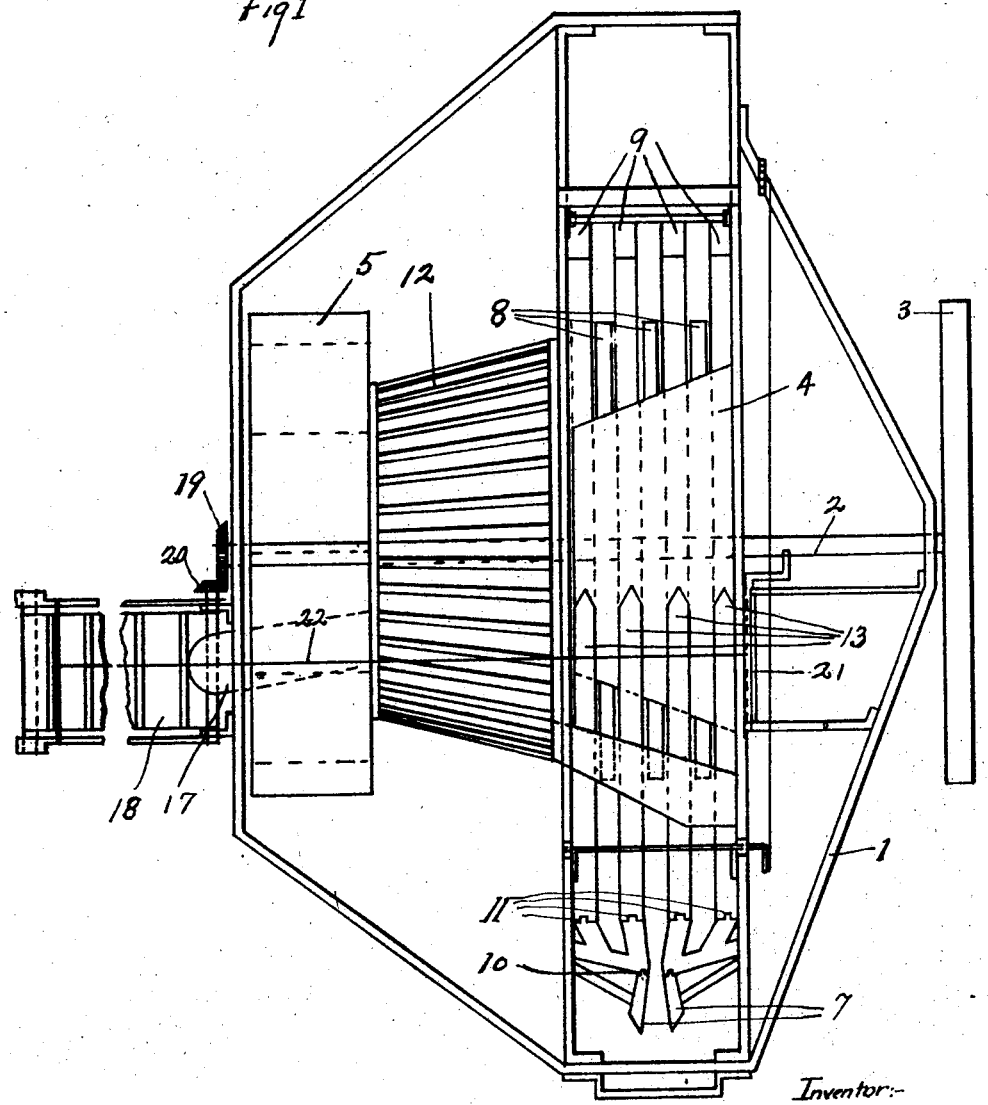

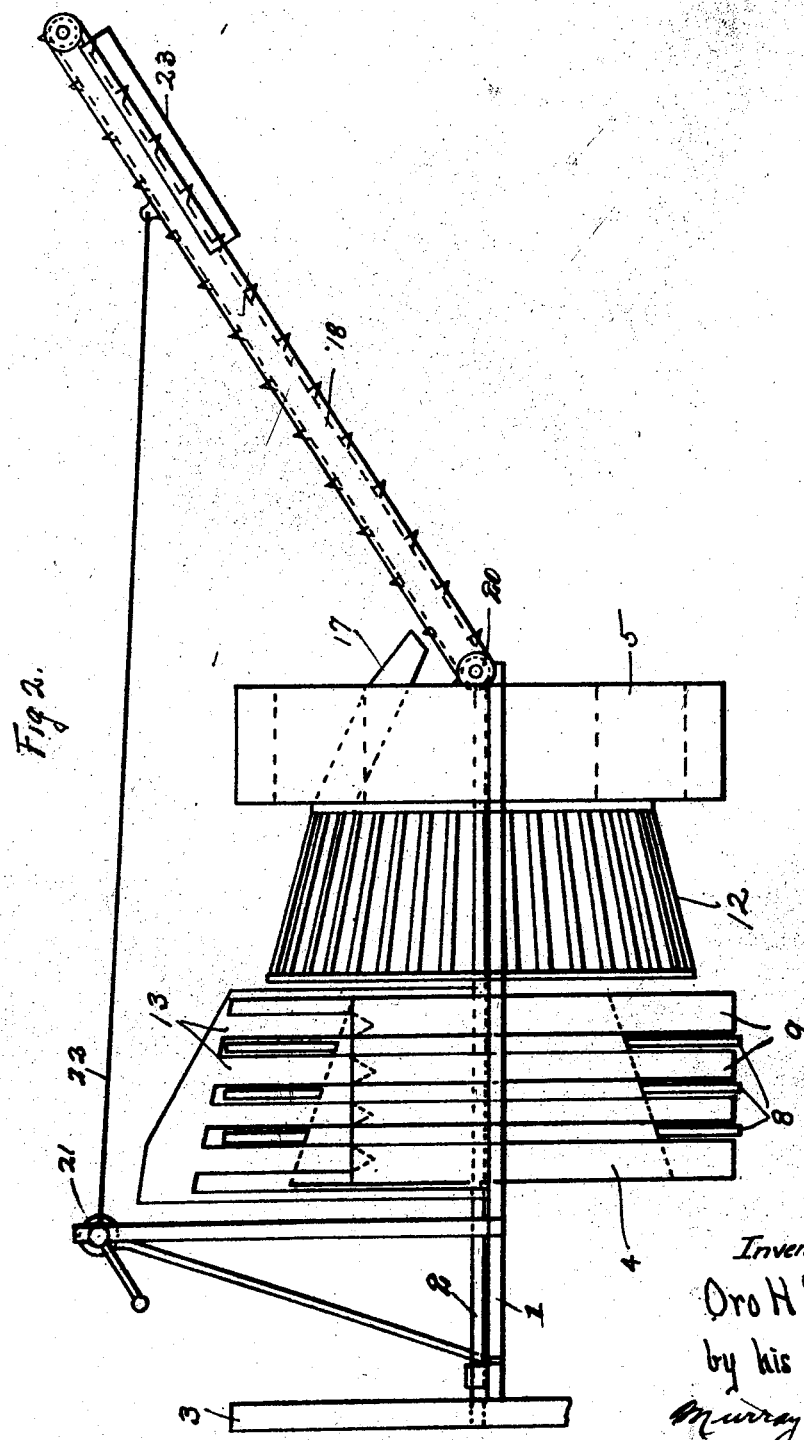

June 23, 1925. 1,543,180
O. H. MOORE
ELEVATING MECHANISM FOR ROOT HARVESTERS
Filed Oct. 9, 1923 5 Sheets-Sheet 3
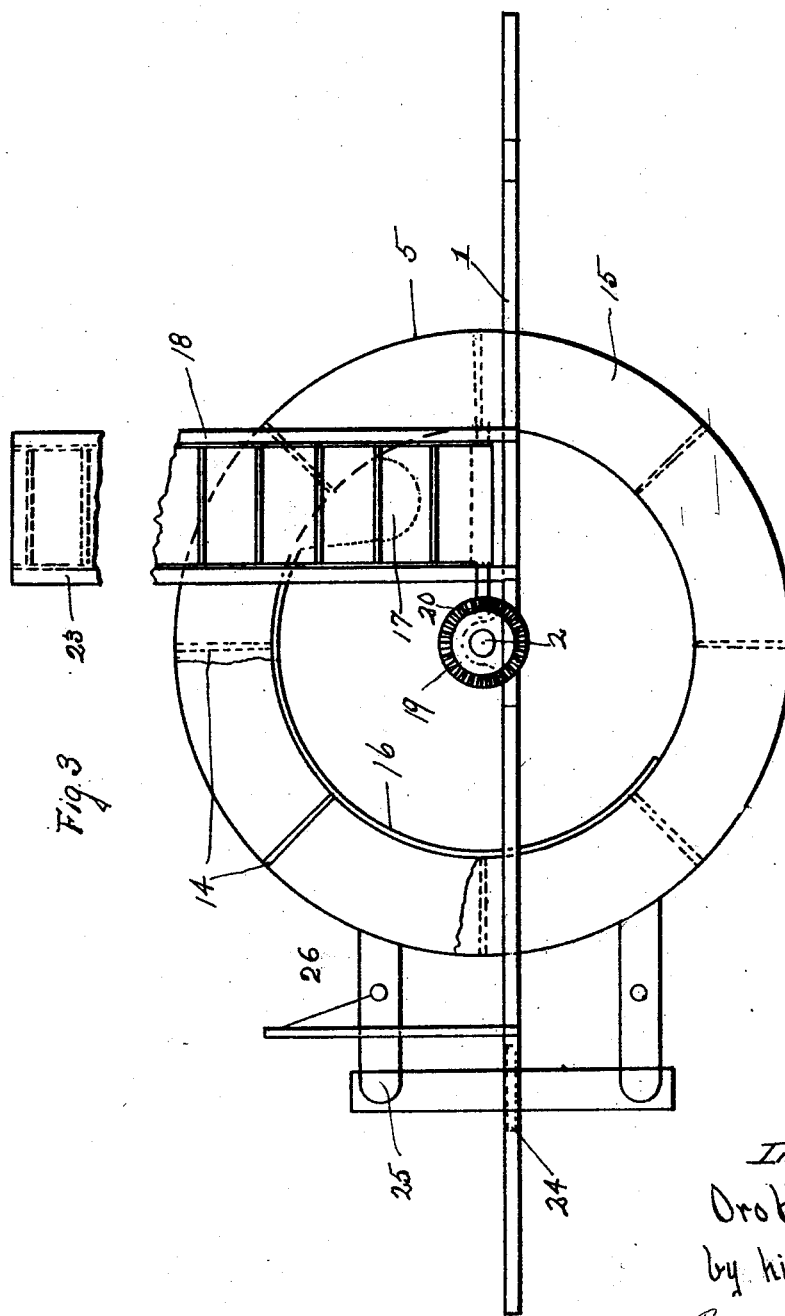

June 23, 1925.
O. H. MOORE
ELEVATING MECHANISM FOR ROOT HARVESTERS
Filed Oct. 9, 1923
1,543,180
5 Sheets-Sheet 4
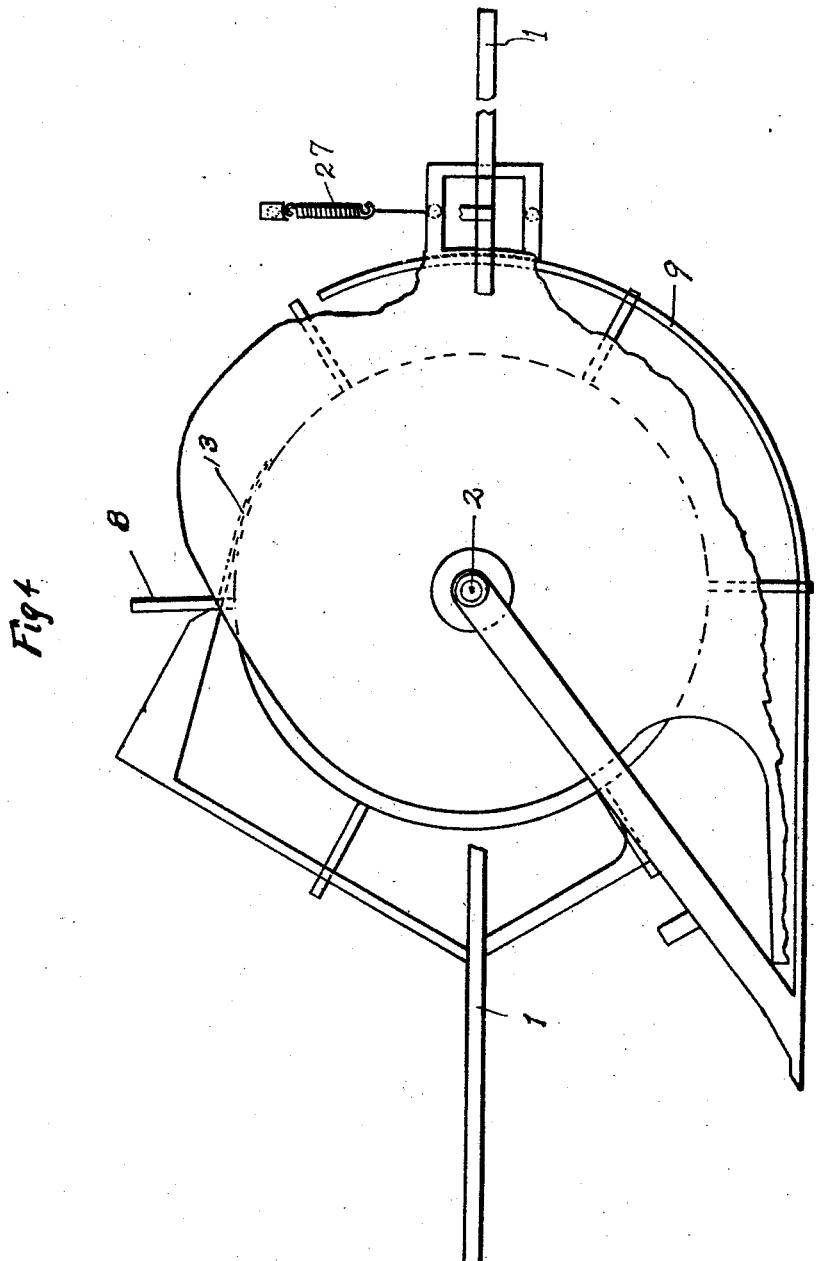
Inventor:—
Oro H. Moore
by his attorney
Murray O. Hayes

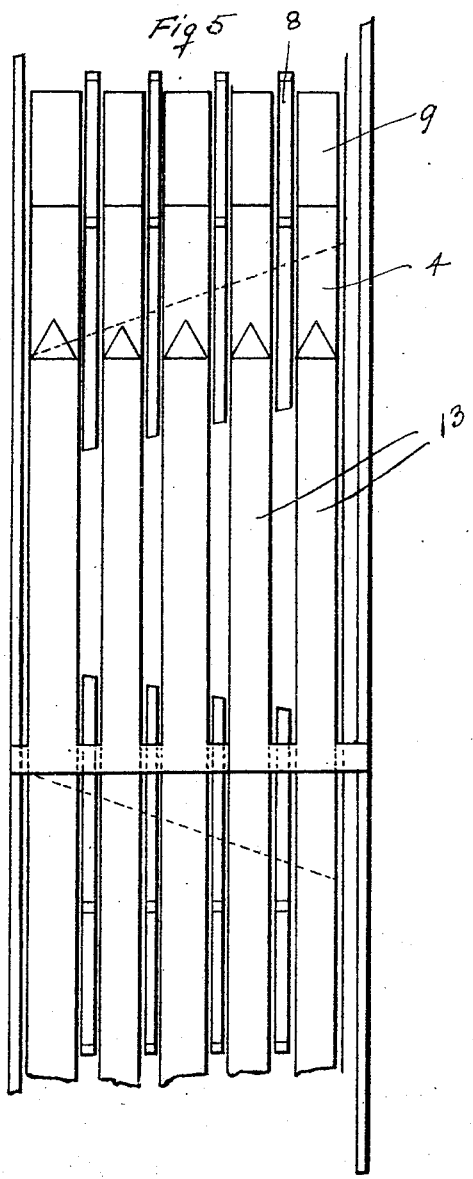

Patented June 23, 1925.

1,543,180

UNITED STATES PATENT OFFICE.

ORO H. MOORE, OF PAYSON, UTAH.

ELEVATING MECHANISM FOR ROOT HARVESTERS.

Application filed October 9, 1923. Serial No. 667,520.

*To all whom it may concern:*

Be it known that I, ORO H. MOORE, a citizen of the United States, residing at Payson, in the county of Utah and State of Utah, have invented a new and useful Elevating Mechanism for Root Harvesters, of which the following is a specification.

This invention relates to an elevating mechanism for use on machines for harvesting root crops such as sugar beets and potatoes, and has for its object the production of a simpler and more efficient means for elevating sugar beets, etc. into a wagon or to a sacking platform in the case of potatoes, free from dirt. These ends are accomplished in the manner hereinafter set forth.

In the drawings:

Fig. 1 is a top plan view showing the essential features of my invention.

Fig. 2 is a rear elevational view of the same.

Fig. 3 is a side elevational view to show the relation of the belt conveyor to the second elevating wheel; this figure also shows the flexible connection between the elevating mechanism and the frame of the machine, and as part of the deep flange of the wheel is broken away, the vanes or blades are better shown.

Fig. 4 is a side elevational view, with parts broken away, of the first elevating wheel, showing its relation to the slat elevating track.

Fig. 5 is a top plan view of the first elevating wheel, showing the fingers which force the beets, etc. off the wheel at the upper part thereof.

Many beet harvesters have been devised and some manufactured, and there are pulling and topping devices which operate satisfactorily. There are none with which I am acquainted in which the means for screening and elevating the topped beets into a wagon function well. I have therefore invented the device which forms the subject of this application to overcome the defects in such machines as are known to me.

My device is simple, has few moving parts and inasmuch as one of the elevating wheels serves also as a ground wheel for the machine, a saving in weight is effected.

The same reference numerals are used to refer to the same parts throughout the drawings.

In Fig. 1 the reference numeral 1 designates the frame; 2 designates the revolving axle to which are secured the ground wheel 3, the first elevating wheel 4, and the second elevating wheel 5, all in such a manner that they must revolve with the axle. The numeral 7 represents the pulling or digging device, but inasmuch as this forms no part of my invention it is represented diagrammatically only, The elevating wheel 4 has mounted on its periphery members 8 which are arranged with as many in each transverse row as may be desirable or necessary, there being any requisite number of the transverse rows. The members as they revolve pass between the slats 9 of the elevating track. As will be noted, these slats have a double hinge connection at 10 and 11 to allow for up and down movement of the slats to compensate for irregularities in the surface of the ground. These slats extend from the pulling mechanism up around the rear part of the elevating wheel a sufficient distance to prevent the beets from falling out of contact with said wheel. It will be noted that the right hand side of the rim of this wheel, as viewed from the front of the machine, has a greater diameter than the left hand side, so that said rim is frusto-conical with the smaller end to the left, viewed as above.

When the beets have been forced up the slats by the members 8 a certain distance, they will fall down upon the rim of the wheel whereupon, as the rim is inclined, they will slide off the wheel into the revolving screen 12, hereinafter described. That the elevated beets may not continue on the elevating wheel and fall down in front thereof fingers 13 are secured to the frame in such a manner that they slope backwardly substantially into contact with the rim of wheel 4, thus pushing off any beets which may not have previously fallen into the screen.

The screen 12, which is made up of slats as shown, also has a driving connection with the axle 2, and extends from the edge of wheel 4 to wheel 5, whereby due to its rotation and slightly frusto-conical shape the beets are freed from dirt then delivered into wheel 5.

This member is shown in Fig. 1 with its conicity exaggerated for purpose of illustration. By having the larger end of the screen to receive the beets they do not pass into wheel 5 so quickly and are therefore more thoroughly cleaned. A shield is provided on the lower side of the machine between screen 12 and the slats 9 and wheel 4 to prevent the beets from falling out upon the ground.

It may under some circumstances be desirable to make the screen 12 cylindrical or even reverse the conicity, but this I consider to be within the scope of my invention.

As can better be seen by referring to Fig. 3 the wheel 5 is furnished interiorly with radially extending vanes 14 which serve to elevate the beets after they have been dropped into the bottom part of the wheel, and also serve to reinforce the rim of the wheel. A deep flange extends radially from the rim of the wheel on each side thereof. An arcuate plate 16 is so arranged interiorly of the vanes that the beets can not fall out until the proper time.

A chute 17 is so placed that as the beets fall from the wheel 5 at the uppermost part thereof they are transferred to an endless cleated belt conveyor designated by the numeral 18, from which they may drop into a wagon or into a row upon the ground. The above conveyor is driven by means of a gear wheel 19 keyed to the axle 2 which meshes with a pinion 20 keyed to a shaft bearing rollers over which the conveyor belt passes. The elevation of the outer end of the conveyor may be adjusted as desired by means of a small windlass 21 and cable 22. A shield 23 is placed on the underside of the outer end of the conveyor to prevent the cleats catching on the wagon or truck into which the beets may be loaded.

The numeral 25 designates a frame work which is secured to the members 9. This frame work is connected to the frame 1 in such a way that it may have a limited movement both back and forth and up and down to compensate for inequalities in the surface of the ground. This is achieved by permitting the vertical members of frame 25 to slide both vertically and horizontally between a strap 24 and the frame. Suspension is accomplished through a cable 26 on each side and a spring 27 placed midway of the frame.

It will readily be perceived that the operation of my device is as follows:

Pressure of the earth and beets as they are lifted up and back over the pullers forces the beets upon the lower anterior ends of the slats 9 of the elevating track, along which they are forced by the members 8 as the wheel 4 revolves until they are sufficiently high that when they drop they will fall upon the conical surface of wheel 4 and thence slide into the screen 12, where they are freed from dirt and then passed into wheel 5 where they are lifted up, dropped into chute 17 down which they slide upon the conveyor 18.

A clutch or similarly acting device for throwing the wheel 4 into and out of gear is provided so that its rotation may be stopped while turning the machine at the ends of the rows.

I claim:

1. In an elevating mechanism for a harvesting machine, an elevating wheel, a screen, and a second elevating wheel, the screen being between the two said wheels.

2. In an elevating mechanism for a harvesting machine, an elevating wheel, an elevating track, a screen, a second elevating wheel, the said track being adjacent the first of said wheels, and the screen between the two said wheels, one of said elevating wheels serving as a ground wheel for the machine.

3. In an elevating mechanism for a harvesting machine, two elevating wheels, an elevating track composed of slats, and a rotating screen, one of said elevating wheels being provided with projecting members that pass between the slats of said track, the said screen being so placed between the two said elevating wheels that the material elevated by the first wheel is conveyed to the second wheel, except such as is sufficiently small to pass out through said screen.

4. In an elevating mechanism for a harvesting machine, two elevating wheels, elevating track made up of slats, a frusto-conical screen, and a revolving axle, the two of said wheels and said screen being concentric with said axle, one of said wheels and said screen being driven by said axle, the said screen being placed between the said elevating wheels, and the said elevating track being arranged substantially concentrically with one of said elevating wheels, which wheel is provided with projecting members which pass between said slats as said wheel revolves, the said screen so arranged as to receive from the said elevating wheel the material elevated thereby and conveying all except the smaller particles of said material to the other elevating wheel, which second elevating wheel is provided at its periphery with deep lateral radially inwardly extending flanges and radially inwardly extending vanes which lift material delivered into said wheel, an arcuate shield being arranged radially inwardly of the ends of said vanes and of such length as to prevent the material elevated from falling from said wheel until the proper time.

ORO H. MOORE.